(50.)
W. DUNCAN.
Improvement in Magnetic Safe Protectors.
No. 4,704. Reissued Jan. 9, 1872.
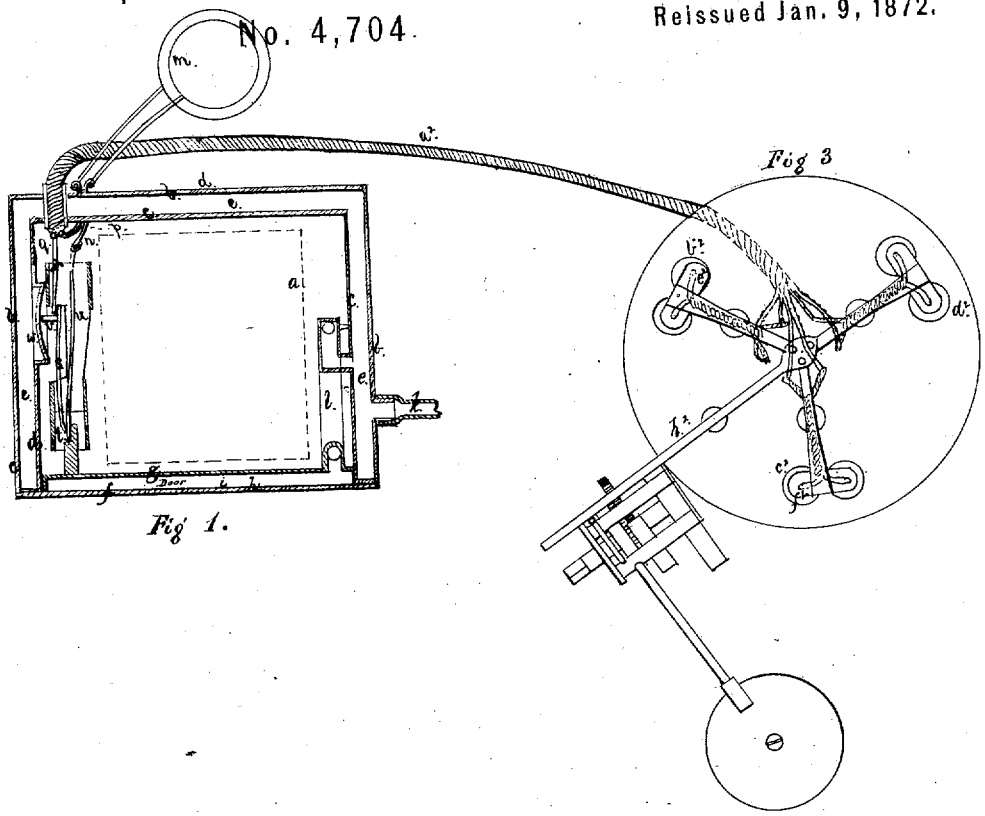
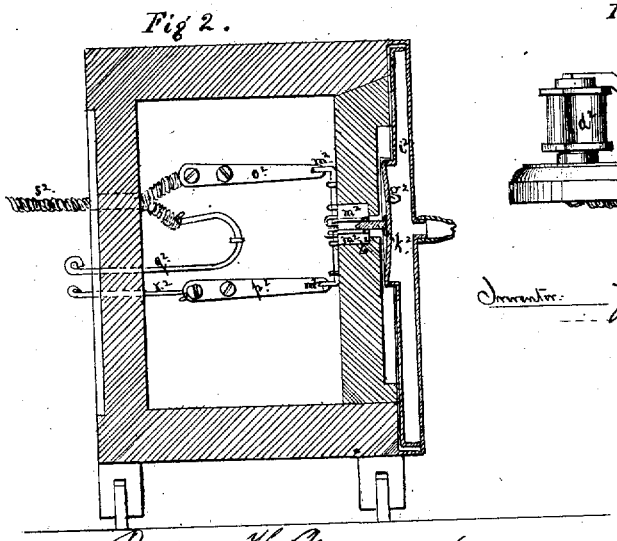
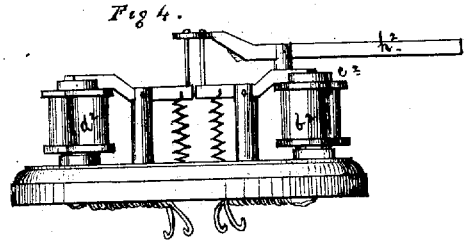
Inventor: William Duncan
per L. A. Dougherty
Witnesses: Robert H. Manners
Edward H. Osborne
N. PETERS. Photo-Lithographer, Washington, D. C.

UNITED STATES PATENT OFFICE.

WILLIAM DUNCAN, OF LEBANON, NEW HAMPSHIRE, ASSIGNOR, BY MESNE ASSIGNMENTS, TO HIMSELF, C. C. ROWELL, AND AARON H. CRAGIN.

IMPROVEMENT IN ELECTRO-MAGNETIC SAFE-PROTECTORS.

Specification forming part of Letters Patent No. 117,713, dated August 1, 1871; reissue No. 4,704, dated January 9, 1872.

Specification describing certain Improvements in Protecting Safes, invented by WILLIAM DUNCAN, of Lebanon, in the county of Grafton and State of New Hampshire.

My invention relates to an improved method of protecting safes from burglarious depredations, by so combining or connecting a safe with an electric circuit composed of a battery and a magnetic coil and armature that the opening of the door or the perforation of any one of the walls of the safe or of a surrounding closet or case breaks the circuit and gives an alarm, the armature of the magnetic coil being connected with an alarm apparatus, so that the retraction of the armature by its spring when released from the magnet, operates an alarm. My invention consists, primarily, in a safe or safe-inclosing closet so constructed and connected with an electric circuit and an alarm apparatus that the opening of the door, or the perforation of the outer plate of the door or either outer plate of the safe, shall break the circuit.

*Description of the Drawing.*

Figure 1 is a top view in section taken in a horizontal plane through the safe-inclosing closet. Fig. 2 is a vertical sectional view through a safe, showing my invention as applied directly to or in connection with the safe-door. Fig. 3 is a top view of the electro-magnets and their armatures and the armature-levers connected with them. Fig. 4 is a side elevation of Fig. 3.

The safe shown by the dotted lines *a* in Fig. 1 is inclosed within an outer safe or closet having hollow walls, and my improved mechanism for actuating the alarm apparatus is connected directly with the inclosing-safe or closet. In Fig. 2 the mechanism is shown as applied directly to the door of a safe. The case or closet *b* which surrounds and incloses the safe is made with hollow walls, or each wall is composed of two plates, *c d*, with an air-tight space between them, shown at *e*. The door *f* is formed of similar plates, *g h*, with an air-space, *i*; and a flexible pipe, *l*, communicates with the space *i* and the space *e* within the walls of the case. The pipe *k* extending through the outer wall of the case is connected with an air-pump, by means of which the air may be more or less exhausted from the chamber *e* and the door-chamber *i*. The inner wall of the case or inclosing-closet is provided with an expanding and collapsing disk, *w*, which is expanded and pressed out by the air within the case when the air is exhausted from the spaces *e i* between the walls of the case. This position is shown in Fig. 1 of the drawing. The circuit-wires from the poles of the electric battery *m* pass through the walls or plates *c d* of the case, and are connected the one, *n*, to the plate or spring *o* and the other, *p*, to the inner end of the cable $a^2$. The end of the cable is also connected with a second wire, *q*, of the circuit, which is attached to a plate or spring, *r*, and the circuit is completed by an intervening spring or finger, *s*, which is in contact at *t* with the plate or spring *o* and at *u* with the plate *r*, this being the position which the parts assume when the safe is inclosed and the door of the inclosing-case is shut and the air exhausted or partially exhausted from the air-chamber. A pin, *v*, projects from the finger *s* toward the face of the expanding and collapsible disk *w*, and when the disk assumes the position seen in the drawing the end of the pin is close to the face of the disk, so that any motion of the disk inward will press back the pin or stud and separate the end of the spring *s* from the plate *r*, and thus break the circuit.

If, by the operations of any person attempting to effect an entrance to the safe, a break or perforation is made at any point through either the outer walls or through the outer door-plates, the air rushing into the spaces *e i* will press the disk *w* inward against the pin or stud *v*, and separate the plate *r* and finger *s* from contact with each other, such separation breaking the circuit and releasing the armatures, which, being drawn back by the springs, trip the alarm mechanism and give an alarm.

The air-exhaust tube *k* may lead from the door-chamber or from any part of the wall-chamber, and these chambers may be disconnected and each have an exhaust-tube.

To provide for breaking the circuit by opening the door the adjacent or outer ends of the springs *o s* are held in contact when the door is closed by an insulated knob or projection, $x$, which presses the end of one spring against the other, and thus closes the circuit; but upon opening the door the knob $x$ is withdrawn from the springs, and their ends are allowed to fly apart and break the circuit.

If but the two main circuit-wires were employed to make connection with the alarm mechanism it would be quite easy for a skilled burglar to complete the circuit outside the safe so that it would not be broken, notwithstanding the circuit-plates or wires inside the case might be separated. I therefore form the connection between the safe and the armature mechanism by compound or cable circuit-wires and an assemblage of magnetic coils and armatures, there being to each coil and armature two circuit-wires. These several pairs of wires and their respective coils and armatures make an equal number of complete circuits, which will be broken by the perforation of any one of the plates of the case or the opening of the door; and it will be necessary to complete each separate circuit outside of the safe in order to prevent the successful operation of the alarm when the case is perforated or the door opened. In the drawing a cable, $a^2$, is shown, having three pairs of main circuit-wires properly wrapped or covered and three coils, $b^2$ $c^2$ $d^2$, and armatures $e^2$ $f^2$ $g^2$, the break of any one of the circuits causing the released armature or armature-lever to be operated by its spring, and the movement of any one or more of the armature-levers tripping a lever, $h^2$, which is connected to an alarm apparatus, and releasing the alarm and setting it in motion. A side elevation of this armature mechanism is seen in Fig. 4. In the modification shown in Fig. 2, in which only the door of the safe is protected, the air-chamber $i^2$ of the door has a collapsible disk, $j^2$, from which an insulated pin, $k^2$, projects. The end of this pin has a metal connector, $l^2$, that, when the door is closed and the air-chamber exhausted, unites two wires, $m^2$ $n^2$, the opposite ends of which bear against two plates, $o^2$ $p^2$, that unite with the battery-wires $q^2$ $r^2$ and with the main circuit-wires $s^2$ leading to the magnetic coil or coils with which the alarm apparatus is connected. When the door is closed and the air exhausted from the chamber $i^2$ the wires $m^2$ $n^2$ are united by the metal connector $l^2$, and the ends of the wires are in contact with the plates $o^2$ $p^2$. If a break or hole is made through the outer plate of the door at this time the disk $j^2$ will collapse and push the metal connector $l^2$ away from the wires, bringing the insulated pin between the wires and breaking the circuit. In like manner, if the door be opened the circuit will also be broken, because the ends of the wires $m^2$ $n^2$ will be drawn away from the plates $o^2$ $p^2$.

The magnetic coils and alarm apparatus may be located in any convenient position and the circuit-wires properly connected thereto.

It will be obvious that many modifications may be made in the arrangement of the mechanism without departing from the essence of my invention.

The air or vacuum-chambers may be differently constructed or arranged, and, instead of exhausting the air from such chambers and operating the alarm by the expansion of a disk or heads, the chambers may be expanded by forcing air into them under pressure, and the alarm operated, through the electric circuit, by the collapsing of the disk or chamber-heads.

Having thus fully described my invention and the manner in which the same is carried into effect, what I claim as my invention is—

1. In combination with a safe or vault for the protection of valuables, the following elements, namely, an electric circuit and an alarm apparatus so constructed and arranged in co-operative relation to each other that a break or perforation through a plate or plates of the safe, or the opening of the door of the safe, breaks the circuit and operates the alarm, substantially in the manner described.

2. A safe inclosed or partially inclosed with walls provided with air-spaces, and having combined therewith an electric circuit and an alarm apparatus so constructed and arranged that a break or perforation through the inclosing hollow walls will break the circuit and operate the alarm.

3. The combination, with a safe, an electric circuit, and an alarm apparatus, of the air-chambers, exhaust-pipes, and expanding and collapsing disks, constructed, arranged, and operating substantially in the manner described.

4. The employment, in connection with a safe, an electric circuit, and an alarm apparatus, of a collapsible disk constructed and operating substantially in the manner described.

5. The construction and arrangement of the circuit closing and breaking mechanism shown at Figs. 1 and 2, substantially as described.

WILLIAM DUNCAN.

Witnesses:
FRANCIS A. CUSHMAN,
ORREN S. WRIGHT.

(50)